(12) United States Patent
Chang et al.

(10) Patent No.: US 9,619,057 B2
(45) Date of Patent: Apr. 11, 2017

(54) TOUCH PANEL AND ELECTRONIC DEVICE (71) Applicant: Shenzhen China Star Optoelectronics Technology Co., Ltd., Shenzhen, Guangdong (CN)

(72) Inventors: Chun-kai Chang, Guangdong (CN); Yung-lun Lin, Guangdong (CN); Jie Qiu, Guangdong (CN); Chengliang Ye, Guangdong (CN); Ruhai Fu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 231 days.

(21) Appl. No.: 14/407,937

(22) PCT Filed: Nov. 25, 2014

(86) PCT No.: PCT/CN2014/092128
§ 371 (c)(1),
(2) Date: Dec. 12, 2014

(87) PCT Pub. No.: WO2016/074280
PCT Pub. Date: May 19, 2016

(65) Prior Publication Data
US 2016/0259438 A1    Sep. 8, 2016

(30) Foreign Application Priority Data

Nov. 11, 2014 (CN) .......................... 2014 1 0631908

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04103* (2013.01); *G06F 2203/04112* (2013.01)

(58) Field of Classification Search
CPC ...... G06F 3/04112; G06F 3/041; G06F 3/044; G06F 2203/04103; G06F 2203/04112
See application file for complete search history.

(56) References Cited

U.S. PATENT DOCUMENTS

2011/0134058 A1*  6/2011  Liu ........................ B82Y 30/00
                                                        345/173
2015/0109545 A1*  4/2015  Gao ..................... H03K 17/962
                                                        349/12

(Continued)

*Primary Examiner* — Nalini Mummalaneni
*Assistant Examiner* — Maheen Javed
(74) *Attorney, Agent, or Firm* — Andrew C. Cheng (57) ABSTRACT The present invention discloses a touch panel and an electronic device. The touch panel includes a transparent substrate, a first conductive micropattern and a second conductive micropattern. The first conductive micropattern defines multiple traces in a plurality of first cells. The second conductive micropattern defines multiple traces in a plurality of second cells. The first conductive micropattern covers the second conductive micropattern, and the first cell overlaps the second cell. The first cell, the second cell and a corresponding area of the substrate in them are as a combination cell. The integral light transmittances between at least part of the combination cells are inconsistent. The present invention can have a low visibility of micropattern and can reduce manufacturing costs.

16 Claims, 4 Drawing Sheets (56) References Cited

U.S. PATENT DOCUMENTS

2015/0267071 A1\* 9/2015 Jin ................. C09D 175/16
  522/18
2016/0202842 A1\* 7/2016 Uriu ................. G06F 3/044
  345/175

\* cited by examiner

TOUCH PANEL AND ELECTRONIC DEVICE

BACKGROUND OF THE INVENTION

Field of the Invention

The present invention relates to the field of touch panel technology, and particularly relates to a touch panel and an electronic device with the touch panel.

Description of Related Art

A single conductive micropattern (e.g., mesh) of the transparent substrate on the touch panel may not be notified by the eyes of people with normal vision actually, but a micropattern combination with higher visibility will be obtained once a first conductive micropattern overlaps a second conductive micropattern.

To solve the above issues, a patent publication (No. CN102334091A) discloses a touch panel comprising a transparent substrate; a first electrically conductive micropattern, the linear trace disposed on or in the first transparent substrate with geometry of the repeating geometric form unit having an open network; a second electrically conductive micropattern, the linear trace line electrically isolated from the first electrically conductive micropattern possesses repeating geometric form unit having a second opening network; a second conductive micropattern overlapping the first electrically conductive micropattern, to meet at least one of the following conditions or combination of them: (1) at least a portion not parallel; (2) different geometric form unit; (3) different cell size.

The visibility of touch panel can be controlled via the non-overlap of the first conductive micropattern and the second conductive micropattern, majorly by adjusting the traces of the first conductive micropattern and the second conductive micropattern to be non-parallel or by designing different geometric form or size of cells in the first conductive micropattern and the second conductive micropattern. The key issue is to adjust the tilt angle between traces resulting the combination micropattern and enhancing the visibility. The process needed to form different geometric form and size in micropattern and arrange the tilt angle is with higher cost and larger workload.

SUMMARY OF THE INVENTION

The present invention is primarily to solve the technical problem of providing a touch panel and electronic devices with lower manufacture costs, and possessing a low visible micropattern.

To solve the above technical issue, the present invention adopts a technical solution to provide a touch panel comprising: a visible light transparent substrate, a first conductive micropattern and a second conductive micropattern. A first conductive micropattern includes a first plurality of trace, and a plurality of first cells disposed in or on the substrate defined by a plurality of first trace. A second electrically conductive micropattern includes a second plurality of trace, and a plurality of second unit cells disposed in or on the substrate defined by a plurality of second trace. The first conductive micropattern overlaps the second conductive micropattern. Each of the first cell possesses different light transmittance, or a part of the first cells possesses different transmittance; and/or each of the second cell possesses different transmittance, or a part of the second cells possesses different transmittance; and/or substrate area corresponding to each of the first cell and the second cells possesses different transmittance; or a part of substrate area possesses different transmittance. Wherein each of the first cell overlaps the corresponding second cell, defining the overlapped first cell, second cell and corresponding substrate area is the combination cell. Each of the combination cell possesses corresponding integral visibility and at least part of the combination cells have inconsistent integral transmittance. The width of trace is 0.5-10 μm; the average transmittance of the substrate is at least 60%.

To solve the above technical problem, another approach of the present invention is to provide a touch panel, comprising: a visible light transparent substrate, a first conductive micropattern and a second conductive micropattern. A first plurality of conductive micropattern includes a first plurality of traces defining a plurality of first cells disposed in or on the substrate. Moreover, a second plurality of electrically conductive micropattern includes a second plurality of traces defining a plurality of second cells disposed in or on the substrate. The first conductive micropattern overlaps the second conductive micropattern. Each of the first conductive cell possesses different transmittance; or a part of the first cells have different transmittance, and/or each of the second conductive cell possesses different transmittance; or a part of the second cells have different transmittance, and/or corresponding area of the substrate in each first cell and second cell possesses different transmittance; or a partial area of the substrate possesses different transmittance, wherein the first cell overlaps the corresponding second cell, defining the overlapped the first cell, the second cell and corresponding area of the substrate compose a combination cell, each of the combination cell possesses a corresponding integral transmittance, and at least the integral transmittance between part of combination cells are inconsistent, wherein the material in all locations of substrate, the first cell or the second cell are same in all locations, but the thickness may not be the same, so the integral transmittance between at least partial of combination cells is inconsistent; wherein the crystalline form are not the same in different locations inside the substrate, resulting the integral transmittance is inconsistent between al least part of combination cells; wherein the surface roughness is not the same in different location of substrate, resulting the integral transmittance is inconsistent between al least part of combination cells; wherein a film is affixed on each of combination cell, resulting the transmittance of each combination cells is different; wherein the transmittance of substrate with affixed film is at least 60%; wherein the film is affixed on each of the combination cell, resulting the transmittance of at least part of the combination cells is different; wherein the transmittance of the substrate with affixed film is at least 60%; wherein the width of traces is 0.5~10 μm; wherein the average transmittance of the substrate is at least 60%, wherein the width of the traces is 0.5~10 μm; wherein the average transmittance of substrate is at least 60%.

To solve the above technical problem, another approach of the present invention is to provide an electronic device, the electronic device comprising a touch panel, the touch panel comprising: a visible light transparent substrate, a first conductive micropattern and a second conductive micropattern. A first plurality of electrically conductive micropattern includes a first plurality of traces defining a plurality of first cells disposed in or on the substrate. Moreover, a second plurality of conductive micropattern includes a second plurality of traces defining a plurality of second cells disposed in or on the substrate. The first conductive micropattern overlaps the second conductive micropattern. Each of the first conductive cell possesses different transmittance; or a part of the first cells possess different transmittance, and/or each of the second conductive cell possesses different transmittance; or a part of the second cells possess different transmittance, and/or corresponding area of the substrate in each first cell and second cell possesses different light transmittance; or a partial area of the substrate possesses different transmittance, wherein the first cell overlaps the corresponding second cell, defining the overlapped the first cell, the second cell and corresponding area of the substrate compose a combination cell, each of the combination cell possesses a corresponding integral transmittance, and at least the integral transmittance between part of combination cells are inconsistent, wherein the material in all locations of substrate, the first cell or the second cell are same in all locations, but the thickness may not be the same, so the integral transmittance between at least of partial combination cells is inconsistent; wherein the crystalline form are not the same in different locations inside the substrate, resulting the integral transmittance is inconsistent between al least part of combination cells; wherein the surface roughness is not the same in different location of substrate, resulting the integral transmittance is inconsistent between al least part of combination cells; wherein a film is affixed on each of combination cell, resulting the transmittance of each combination cells is different; wherein the width of the traces is 0.5~10 μm; wherein the average transmittance of the substrate is at least 60%.

The beneficial effects of the present invention are: it is different from the current technology and the touch panel in this invention is with inconsistent transmittance between at least part of the combination cells, the combination cells with different transmittance are disposed on whole touch panel to make the transmittance inconsistent, the contrast is not strong between the first traces, the second traces and combination cells; the visibility of the first traces and the second traces are lowered, then the visibility of conductive micropattern is reduced. In the manufacturing process of the touch panel in present invention, the shape and size conductive micropattern can be same and it is not necessary to consider the tilt angle, so low visibility of micropattern can be obtained, the workload is lowered and the cost can be reduced.

DESCRIPTION OF THE EMBODIMENTS

Figure 1:
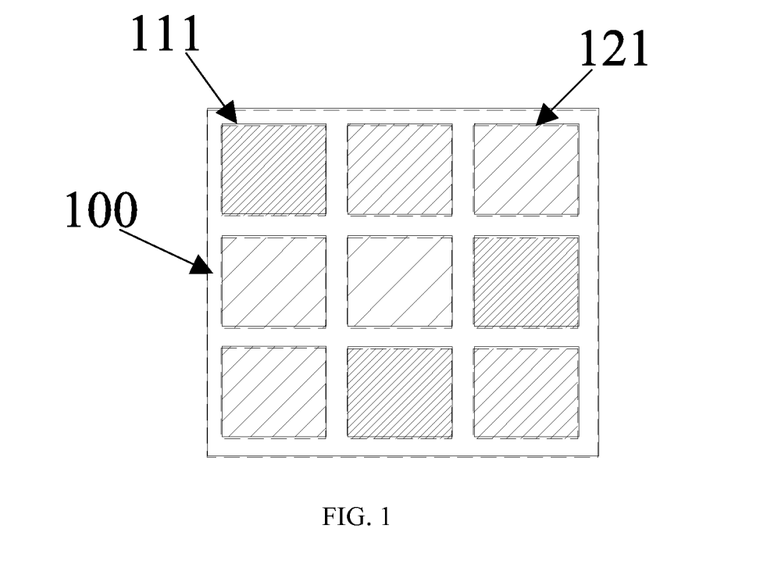
FIG. 1 is a structural schematic view of a touch panel according to the first embodiment.
Figure 2:
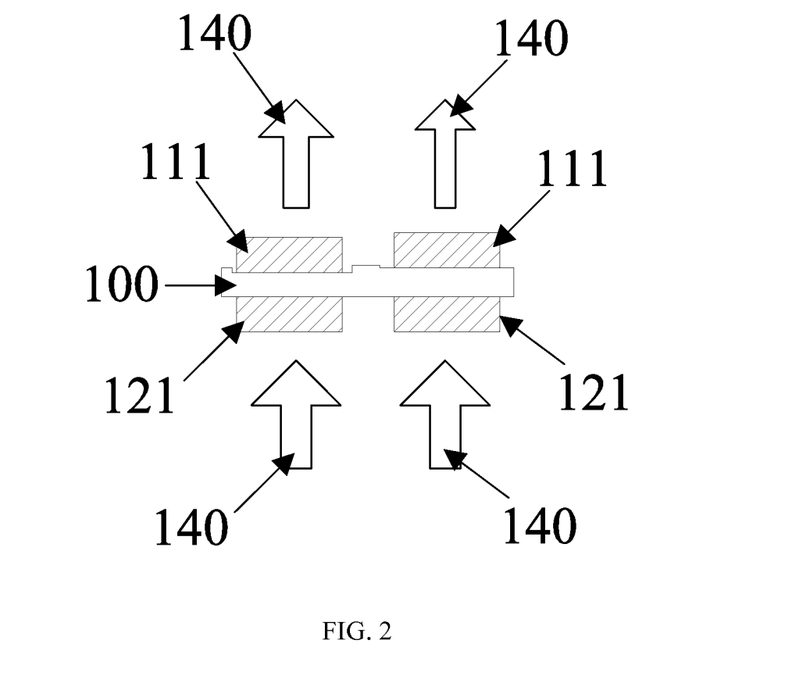
FIG. 2 is a longitudinal cross-sectional structural schematic view of a touch panel according to the first embodiment.

Please refer to FIG. 1 and FIG. 2. FIG. 1 is a structural schematic view of a touch panel according to the first embodiment, and FIG. 2 is a longitudinal cross-sectional structural schematic view of a touch panel according to the first embodiment.

The electronic device of the present invention includes a touch panel, the touch panel includes a transparent substrate 100, the first and the second electrically conductive micropattern.

Wherein the first plurality of conductive micropattern includes a plurality of first traces, which defining a plurality of first cells 111 disposed in or on the substrate. The second plurality of conductive micropattern includes a plurality of second traces, which defining a plurality of second cells 121 disposed in or on the substrate. The first conductive micropattern overlaps the second conductive micropattern. Each of the first cell 111 possesses a different transmittance; or a portion of the first cell 111 possesses a different transmittance. And/or each of the second cell 121 possesses a different transmittance; or a portion of the second unit cell 121 possesses a different transmittance. And/or each of the first cell 111, second cell 121 corresponding to the substrate 100 possessing different transmittance; or, part of the substrate 100 possessing a different transmittance.

Wherein each of the first cell 111 coincides the corresponding second cell 121, the first cell 111, the second cell 121 and corresponding substrate 100 area are defined as a combination cell, each combination cell possesses corresponding integral transmittance, and at least part of combination cells are with inconsistent integral transmittance.

The substrate 100 is typically a thin film (e.g., PET film), which may also be a glass having a thickness of 5-1000 μm, average transmittance of the substrate 100 is at least 60%, preferably 85%. The first conductive micropattern and the second conductive micropattern electrically isolated from each other, which may be disposed over the substrate 100 on or within the same, or the first conductive micropattern and the second conductive micropattern disposed on or within different substrate 100. Width of the first trace and the second trace is 0.5-10 μm.

The difference of the transmittance can be achieved by making the different transmittance on each location of the substrate 100, and the transmittance of each location of the substrate 100 can be changed via controlling the property of the substrate 100 in manufacturing process, such as changing the thickness of the substrate 100, surface roughness, crystalline forms or the density. In addition, under uniform transmittance of the substrate 100, the transmittance of combination cell with film will be different by affixing film with various transmittance.

Distinguished from the current technology, the touch panel of the present invention, the first cell 111, the second cell 121 and the corresponding substrate 100 area is a combination of cell, each combination cell possessing a corresponding integral transmittance, at least part of combination cells are with inconsistent integral transmittance. Combination cells with different transmittance are distributed on all of touch panel to make the whole touch panel with inconsistent transmittance, then the contrast of the first traces, the second traces and combination cells is not strong enough to reduce the visibility of conductive micropattern due to the low contrast of the first trace and the second trace from human vision. In the manufacturing process of touch panel in present invention, the form and size of conductive micropattern can be the same, and it is not necessary to consider the selection of tilt angle. The low visibility of micropattern can be achieved, workload is lowered and the cost is reduced.

In this embodiment, at least the inconsistent integral transmittance of partial combination cells is achieved via inconsistent transmittance of substrate 100. Inconsistent transmittance of substrate is achieved due to non-uniform thickness in each location of substrate 100, as the light beam 140 passes through substrate, the location with higher thickness in substrate 100 has more light loss and the transmittance is lower; the location with lower thickness in substrate 100 has less light loss and the transmittance is higher. As shown in FIG. 2, all of the first cells 111 are with consistent transmittance, all of the second cell are with consistent transmittance, the corresponding substrate 100 thickness of first cell 111 on left side is thinner than the corresponding substrate 100 thickness of first cell 111 on right side; therefore, the light beam 140 through the combination cell on left side is more than the light beam 140 through the combination cell on right side, so the integral transmittance of combination cells on left side is larger than the integral transmittance of combination cells on right side.

Thickness of the substrate 100 are not identical, it can be changed by controlling the factors in the formation process of substrate 100.

If the substrate 100 is a PET film, PET film forming process includes following steps: (1) pre-drying the PET resin chips; (2) in an extruder is extruded through the T-die thick amorphous thick sheet; (3) cooling drum or quench cooling liquid, to keep an amorphous state; (4) a tender biaxially stretched the thick sheet, made of PET film; (5) longitudinal and transverse heat-set the stretched film, to eliminate the deformation of the film produced by the stretching, a film is made with better thermal stability.

For example, the adjustment of the die gap will directly affect the uniformity of the film thickness during extrusion, so the die gap adjustment to make the film non-uniform, some parts of the gap are larger and some are smaller to control the extruded amount. Therefore, the formed film thickness will not be uniform, some locations are thin and some locations are thick, so the inconsistent transmittance of film is formed.

Such kind of film can be formed during the time of PET film cooling down through adjusting cooling air amount all around the film to be inconsistent, then the cooling effect on film is non-uniform to form a film with non-uniform thickness and non-uniform transmittance.

Moreover, the film pulling speed can be changed in the process and the pulling speed can be inconsistent and changes dynamically, resulting the change of thickness and transmittance of the film as well.

In this embodiment, the adjustment of the die gap, the die temperature, air volume or the pulling speed in the process of PET film, so at least a portion of the thickness of the combination cells in the PET film are different and the transmittance of different locations of PET film are inconsistent. This results reduction of visibility of the first trace and the second trace and decrement of contrasts between the first trace, the second trace and corresponding combination cells, so the visibility of micropattern cab be reduced as well.

Figure 3:
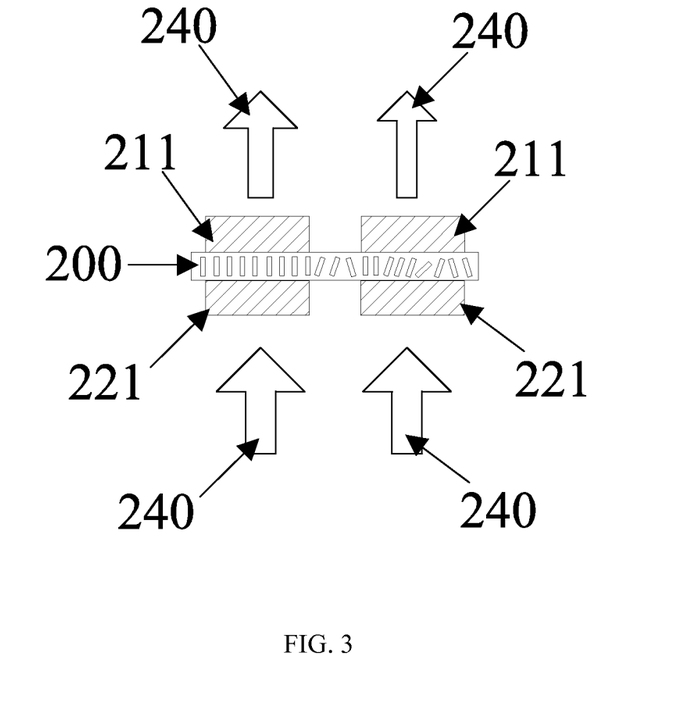
FIG. 3 is a longitudinal cross-sectional structural schematic view of a touch panel according to the second embodiment.

Refer to FIG. 3, it is the longitudinal cross-sectional structural schematic view in the second embodiment of present touch panel invention. The difference between the present embodiment and the first embodiment is: at least inconsistent integral transmittance of part of combination cells is due to inconsistent transmittance of the substrate 200. The inconsistent transmittance of the substrate 200 is due to inconsistent crystalline form in each location of substrate 200. Non-uniform crystalline means the inconsistent alignment of crystalline grain preferred orientation in each location. When the light beam passes through the substrate 200, transmittance is higher if the better alignment of crystalline grain preferred orientation in substrate 200; but transmittance is lower if the worse alignment of crystalline grain preferred orientation in substrate 200. For example, if the substrate 200 is film, the alignment of crystalline grain preferred orientation is inconsistent and the temperature can be adjusted in thermal forming process to make the temperature of film inconsistent. Crystallization is the polymer chains or chain sections forming closed pack and interaction is happened during preferred orientation alignment process, then the crystal grain is formed. Preferred orientation is the alignment of polymer chains or chain sections under the extrinsic force, higher preferred orientation will be helpful for crystallization. In the tension process and under lower tensile temperature, PET polymer has a better alignment of preferred orientation in crystal grain under extrinsic force resulting a better crystallization and better transmittance. In a lower temperature of thermal forming location, the crystal grain formed by PET polymer keeps good alignment in tensile process, but in a higher temperature of thermal forming location, the PET polymer chain in preferred orientation of crystal grain will dissociate to make the preferred orientation in crystal grain not as good as the location with lower temperature in thermal forming and lower the transmittance. As shown in FIG. 3, the thickness of substrate 200 is uniform, so the transmittance of all of the first cells 211 are the same and the transmittance of all of the second cells 221 are the same. The preferred orientation of crystal grain of corresponding substrate 200 on the left side of the first cell 211 are with good alignment, but the preferred orientation of crystal grain of corresponding substrate 200 on the right side of the first cell 211 are without good alignment, so the integral transmittance of combination cell on left side is larger than the integral transmittance of combination cell on right side and the light beam passing through the combination cell on the left side is more than the light beam passing through the combination cell on the right side. The present embodiment is to adjust the temperature of thermal forming to make the temperature on each location of the film not the same and let the preferred orientation of crystal grain in at least part of the combination cells of the film with different alignment condition, to make transmittance in each location of the film not the same, and to lower the visibility of micropattern due to lowering visibility of the first trace and the second traces as well as contrast reduction among the first traces, the second traces and the combination cells.

Figure 4:
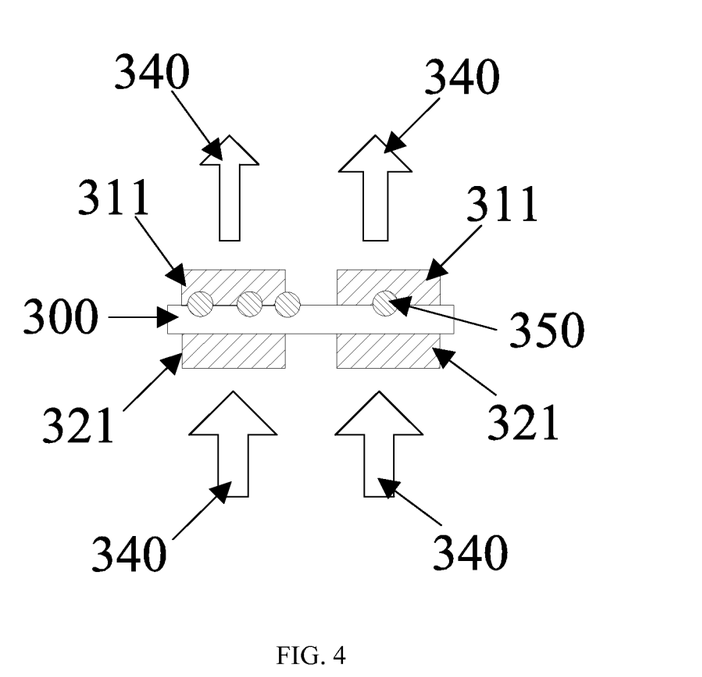
FIG. 4 is a longitudinal cross-sectional structural schematic view of a touch panel according to the third embodiment.

Refer to FIG. 4, it is a longitudinal cross-sectional structural schematic view of a touch panel in the third embodiment of present invention. The difference between the present embodiment and the first embodiment is the inconsistency of integral transmittance among at least part of the combination cell obtained via controlling the non-uniform surface roughness of the substrate 300. The non-uniform roughness of the substrate 300 is formed due to the non-uniform distribution of additives 350 on each location of substrate 300. Because of the non-uniform distribution of additive 350, the substrate 300 with higher roughness having more additives 350 loses more light and results lower transmittance and the substrate 300 with lower roughness having less additives 350 loses less light and results higher transmittance as light beam 340 passes though the substrate 300. Non-uniform roughness of substrate 300 can be formed through adding of additives 350 in forming process and the non-uniform distribution of additives 350.

In order to prevent blocking of PET film as winding, additives 350 are usually added to the PET film, the main additives 350 for PET film are silica, calcium carbonate, barium sulfate, kaolin, etc., the surface micro-roughness of PET film can be increased by distributing the particles of additives 350 in the film to keep some air between PET film as winding and prevent from film blocking. In the present embodiment, additives are non-uniform distributed under same amount with normal film manufacturing process and keeping all of processing condition as adding additives into PET film. As shown in FIG. 4, assuming thickness of the substrate 300 is uniform, transmittance of all of the first cell 311 is the same and transmittance of all of the second cell 312 is the same, the distribution of additives 350 is denser for the first cell 311 on left side is with higher roughness and the distribution of additives 350 is looser for the second cell 311 on right side is with lower roughness. Therefore, the integral transmittance of the combination cell on left side is less than the integral transmittance of the combination cell on right side, the light beam 340 passing through the combination cell on left side is less than the light beam 340 passing through the combination cell on right side. The present embodiment is to make a non-uniform distribution of additives 350 in reasonable using amount as putting additives 350 to make at least a part of combination cell with different surface roughness and different transmittance on each location of the substrate 300. This will lower the visibility of the first traces and the second traces, lower the contrast between the first trace, the second trace and the combination cells and reduce the visibility of conductive micropattern.

Figure 5:
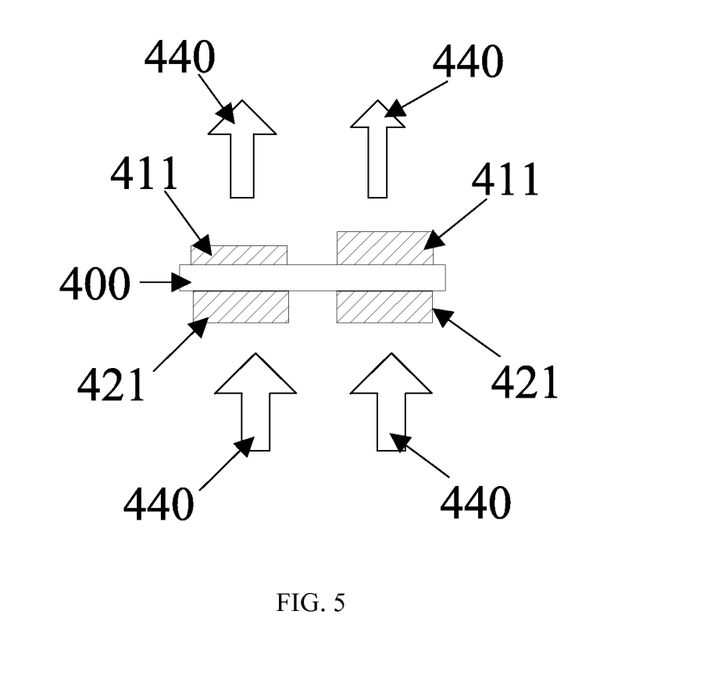
FIG. 5 is a longitudinal cross-sectional structural schematic view of a touch panel according to the fourth embodiment.

Refer to FIG. 5, it is a schematic longitudinal cross-section structure for the touch panel of the fourth embodiment in the present invention. The difference between the present and the first embodiment is: the transmittance is same for all the substrate 400, but transmittance of a part of the first cells 411 is inconsistent in this embodiment. The inconsistent transmittance in a part of the first cells 411 is due to the non-uniform thickness of the first cell 411. The present embodiment is to coat an ITO conductive film on the substrate 400 and form a non-uniform thickness of the ITO conductive film to result the non-uniform thickness of the first cell 411 defined by the first trace, and/or the non-uniform thickness of the second cell 421 defined by the second trace, so the integral transmittance of combination cell is inconsistent. As shown in FIG. 5, the thickness of the first cell 411 on left side is thinner and the thickness of the first cell 411 on right side is thicker, so the transmittance of the combination cell on left side is higher than the transmittance of the combination cell on right side and the light beam 440 passing through the combination cell on left side is more than the light beam 440 passing through the combination cell on right side.

Of course, the transmittance of each first cell 411 can be different, or transmittance of each second cell 421 is inconsistent, or the transmittance of at least part of the second cell 421 is inconsistent, and the inconsistent integral transmittance can be accomplished via all of above approaches.

Figure 6:
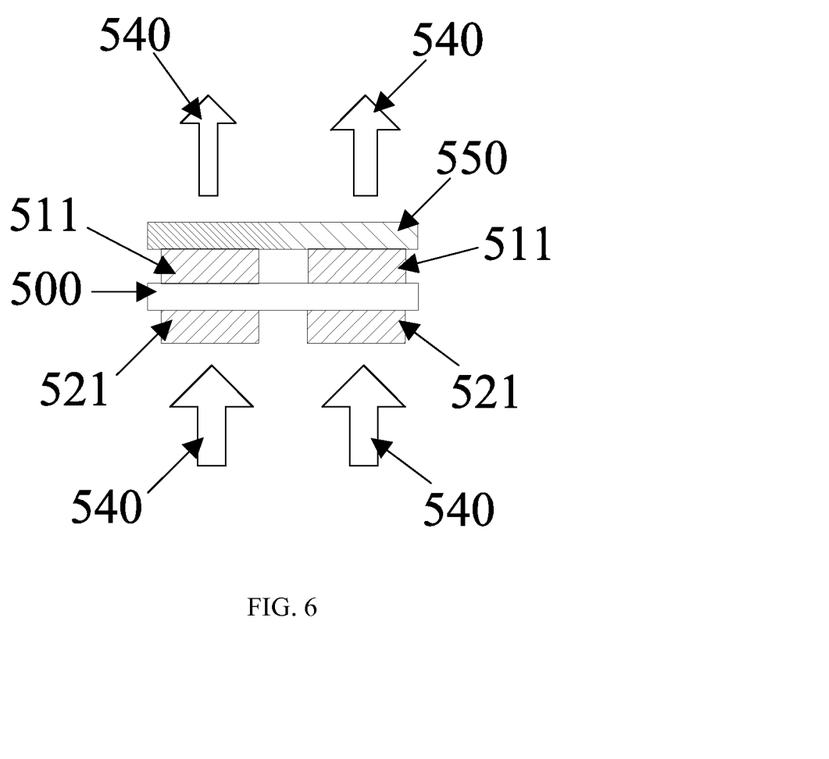
FIG. 6 is a longitudinal cross-sectional structural schematic view of a touch panel according to the fifth embodiment.

Refer to FIG. 6, it is a longitudinal cross-sectional structural schematic view of a touch panel in fifth embodiment in the present invention. The difference between the present and the first embodiment is: the transmittance is same for all the substrate 500 and the transmittance of each first cell 511 and second cell 521 is same. The transmittance of combination cell with the protective film 550 is assured to be at least 60% by affixing a protective film 550 on each combination cell and the integral transmittance is different for each of the combination cell with the protective film due to the different transmittance of the protective film 550 on each of the combination cell. Moreover, it is possible that the transmittance is inconsistent for the protective film on a part of combination cell, so the inconsistent transmittance can be accomplished for at least a part of combination cells. As shown in FIG. 6, the transmittance of the protective film corresponding to the combination cell on left side is lower and the transmittance of the protective film corresponding to the combination cell on right side is higher in order to make the transmittance is different for at least a part of the combination cells with the protective film 550. Therefore, the light beam 540 passing through the combination cell is less on left side and the light beam 540 passing through the combination cell is more on right side to make the transmittance of whole of touch panel inconsistent. The present embodiment is to affix protective film 550 with different transmittance on the surface of each combination cell to result the transmittance is not the same on each location of touch panel, then the visibility of the first trace and the second trace is lowered, the contrast between the first trace, the second trace and the combination cell is lowered and the visibility of conductive micropattern is reduced.

The present invention is to form a touch panel having inconsistent transmittance to lower the visibility of the first trace and the second trace because of inconsistent integral transmittance of at least part of combination cells. In manufacturing process of the touch panel in present invention, the size and form of the conductive micropattern can be same and it is not necessary to consider the selection of tilt angle to obtain a micropattern and low visibility while workload can be decreased and cost can be reduced.

The above described embodiments of the present invention do not limit the scope of the present invention. All of the equivalent structure or process exchange based on the specification and figures of the present invention, either directly or indirectly utilized in other related technical fields, is equivalently included in the protection areas of the present invention.

What is claimed is:
1. A touch panel, which comprises:
a substrate transparent to visible light;
a first conductive micropattern including a plurality of first traces, the first traces defining a layout of a plurality of first cells in or on the substrate, the first cells being arranged in a two-dimensional array; and
a second conductive micropattern including a plurality of second traces, the second traces defining a plurality of second cells electrically isolated with the first conductive micropattern and arranged in a two-dimensional array;
the first conductive micropattern covering the second conductive micropattern;
areas of the substrate respectively corresponding to the first cells as well as the second cells having different transmittances;
the area of the substrate corresponding to the overlapped first and second cells cooperatively form a combination cell including one pair of first and second cells coincided with each other in an overlapping direction of the pair of first and second cells and thereby a plurality of the combination cells are defined,
each of the combination cells has a corresponding integral transmittance and the integral transmittances of at least part of the combination cells are inconsistent due to the inconsistent alignment of crystalline grain in different locations of the substrate corresponding to the combination cell;

wherein widths of the first traces and of the second traces each are 0.5~10 μm, and an average transmittance of the substrate is at least 60%.

2. A touch panel, which comprises:

a substrate transparent to visible light;

a first conductive micropattern including a plurality of first traces, the first traces defining a layout of a plurality of first cells in or on the substrate, the first cells being arranged in a two-dimensional array; and a second conductive micropattern including a plurality of second traces, the second traces defining a plurality of second cells electrically isolated with the first conductive micropattern and arranged in a two-dimensional array;

the first conductive micropattern covering the second conductive micropattern;

the first cells having different transmittances, and/or the second cells having different transmittances, and/or areas of the substrate respectively corresponding to the first cells as well as the second cells having different transmittances;

wherein each of the first cells, each of the second cells overlapped with the first cell and the area of the substrate corresponding to the overlapped first and second cells cooperatively form a combination cell including one pair of first and second cells coincided with each other in an overlapping direction of the pair of first and second cells and thereby a plurality of the combination cells are defined, each of the combination cells has a corresponding integral transmittance and the integral transmittances of at least part of the combination cells are inconsistent due to the inconsistent alignment of crystalline grain in different locations of the substrate corresponding to the combination cell.

3. The touch panel according to claim 2, wherein the material of the substrate or of the first cells or of the second cells is uniform, and thicknesses of the areas of the substrate corresponding to the combination cells or of the first cells or of the second cells are not the same, so that the integral transmittances between at least part of the combination cells are inconsistent.

4. The touch panel according to claim 2, wherein the surface roughness is not the same in a different location of the substrate, resulting the integral transmittances are inconsistent between at least part of the combination cells.

5. The touch panel according to claim 2, wherein a film is affixed on each of the combination cells, resulting the transmittance of the film of each of the combination cells is not the same.

6. The touch panel according to claim 5, wherein the transmittance of the substrate with the attached film is at least 60%.

7. The touch panel according to claim 2, wherein a film is attached on each of the combination cells, resulting the transmittance of the film of a part of the combination cells is not the same.

8. The touch panel according to claim 7, wherein the transmittance of the substrate with the affixed film is at least 60%.

9. The touch panel according to claim 2, wherein the width of the trace is 0.5~10 μm.

10. The touch panel according to claim 2, wherein the average transmittance of the substrate is at least 60%.

11. An electronic device, including a touch panel, the touch panel comprising:

a substrate transparent to visible light;

a first conductive micropattern including a plurality of first traces, the first traces defining a layout of a plurality of first cells in or on the substrate, the first cells being arranged in a two-dimensional array; and a second conductive micropattern including a plurality of second traces, the second traces defining a plurality of second cells electrically isolated with the first conductive micropattern and arranged in a two-dimensional array;

the first conductive micropattern overlapping the second conductive micropattern;

wherein a plurality of combination cells each have a corresponding integral transmittance and the integral transmittances of at least part of the combination cells are inconsistent due to the inconsistent alignment of crystalline grain in different locations of the substrate corresponding to a combination cell;

each of the combination cells comprises one of the first cells, one of the second cells overlapped with the first cell and an area of the substrate corresponding to the overlapped first and second cells such that the combination cell comprises one pair of first and second cells coincided with each other in an overlapping direction of the pair of first and second cells.

12. The electronic device according to claim 11, wherein the material of the substrate or each of the first cells or of the second cells is uniform, and thicknesses of the areas of the substrate corresponding to the combination cells or of the first cells or of the second cells are not the same, so that the integral transmittances between at least part of the combination cells are inconsistent.

13. The electronic device according to claim 11, wherein surface roughnesses of the areas of the substrate respectively corresponding to the combination cells are not the same while thicknesses of the areas of the substrate are uniform, transmittances of the first cells are the same and transmittances of the second cells are the same, resulting the integral transmittances are inconsistent between at least part of the combination cells.

14. The electronic device according to claim 11, wherein a film is affixed on each of the combination cells and portions of the film respectively corresponding to the combination cells have different transmittances while transmittances of the areas of the substrate respectively corresponding to the combination cells are the same, transmittances of the first cells are the same and transmittances of the second cells are the same, resulting the integral transmittances are inconsistent between at least part of the combination cells.

15. The electronic device according to claim 11, wherein the width of the trace is 0.5~10 μm.

16. The electronic device according to claim 11, wherein the average transmittance of the substrate is at least 60%.

* * * * *